No. 883,148. PATENTED MAR. 24, 1908.
F. SANDERS.
MOLDING MACHINE FOR CUTTING PANELS.
APPLICATION FILED JUNE 7, 1907.
2 SHEETS—SHEET 1.
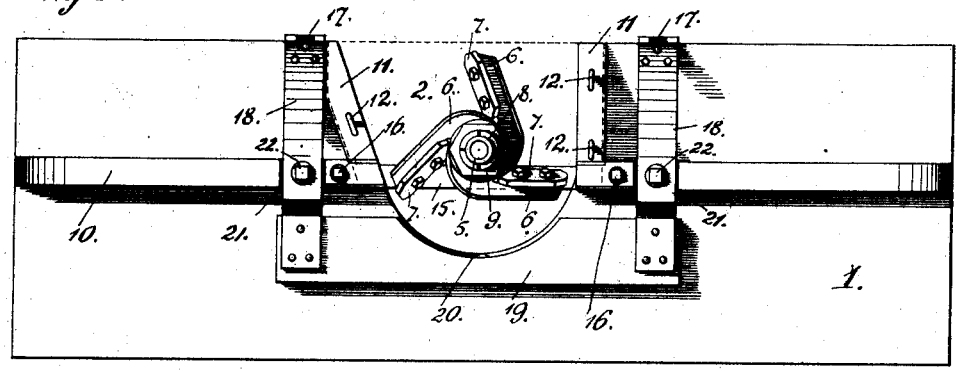
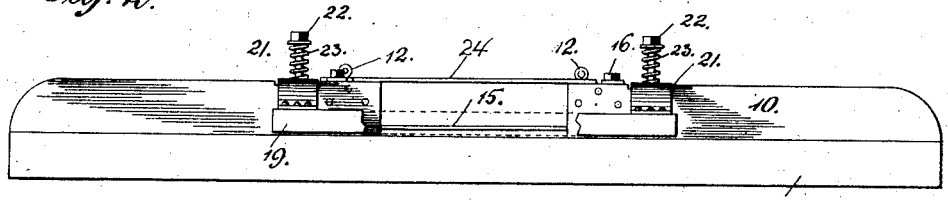
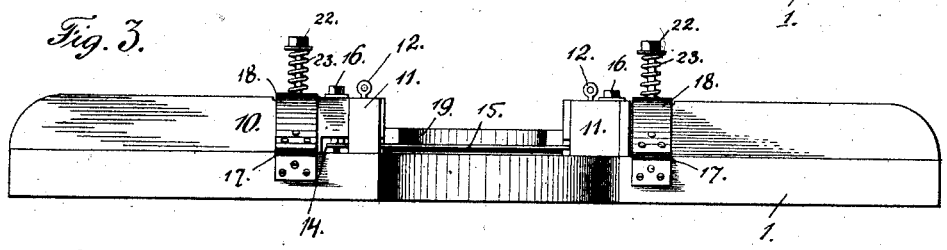
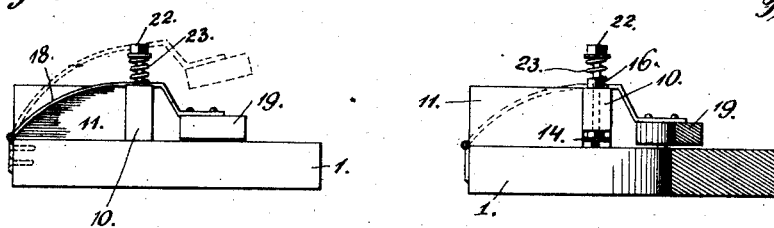
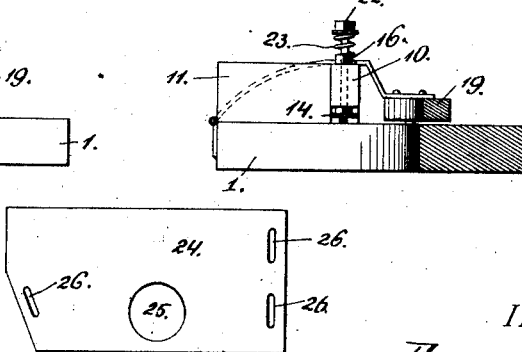
WITNESSES:
A. H. Rabsag,
INVENTOR
Frank Sanders
BY H. C. Everit Co.
Attorneys No. 883,148. PATENTED MAR. 24, 1908.
F. SANDERS.
MOLDING MACHINE FOR CUTTING PANELS.
APPLICATION FILED JUNE 7, 1907.
2 SHEETS—SHEET 2.
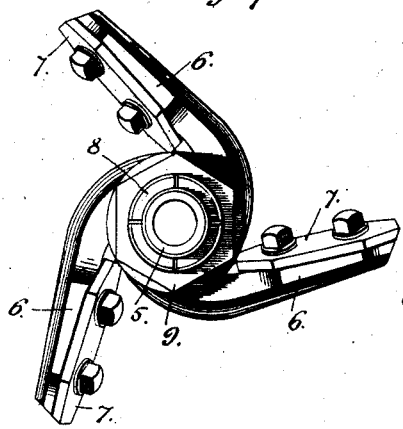
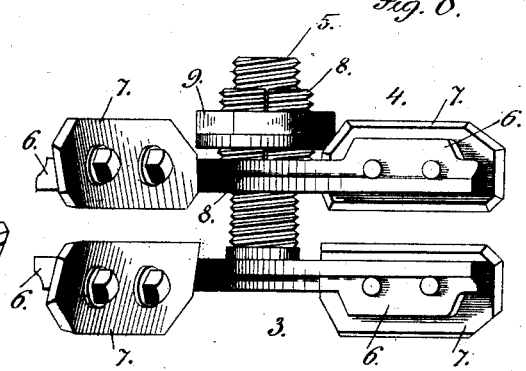
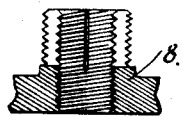
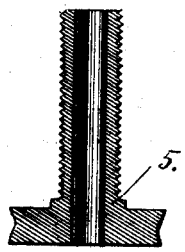
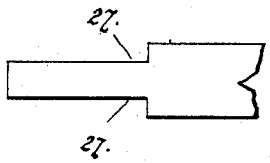
WITNESSES:
A. H. Rabság,
INVENTOR
Frank Sanders
BY H. C. Everet Co.
Attorneys
THE NORRIS PETERS CO., WASHINGTON, D. C.

UNITED STATES PATENT OFFICE.

FRANK SANDERS, OF McKEESPORT, PENNSYLVANIA.

MOLDING-MACHINE FOR CUTTING PANELS.

No. 883,148.      Specification of Letters Patent.      Patented March 24, 1908.

Application filed June 7, 1907. Serial No. 377,698.

*To all whom it may concern:*

Be it known that I, FRANK SANDERS, a citizen of the United States of America, residing at McKeesport, in the county of Allegheny and State of Pennsylvania, have invented certain new and useful Improvements in Molding - Machines for Cutting Panels, of which the following is a specification, reference being had therein to the accompanying drawing.

This invention relates to molding machines for cutting panels, and the invention has for its object to provide a novel guide and resilient clamp for molding machines, the guide and clamp being constructed to steady a piece of work while being operated upon by the cutter blades of the machine.

My improvements can be readily embodied in the ordinary molding machine at present used or may be constructed as an attachment for the machines. In either instance, I employ a detachable shield for the revoluble cutter blades of the machine, to deflect the shavings and protect an operator's hand from accidentally contacting with the cutter blades.

The detail construction entering into my invention will be more fully described and then specifically pointed out in the appended claims, and referring to the drawing forming part of this specification, like numerals of reference designate corresponding parts throughout the several views, in which:—

Figure 1 is a plan of my improved molding machine, Fig. 2 is a front elevation with the cutter removed, Fig. 3 is a rear elevation with the cutter removed, Fig. 4 is an end view, Fig. 5 is a cross sectional view, Fig. 6 is a plan of a shield used in connection with the machine, Fig. 7 is a plan of the cutter blades of a molding machine, Fig. 8 is an elevation of the same, Fig. 9 is a sectional view of a lock nut used in connection with the cutter blades, Fig. 10 is a fragmentary sectional view of the upper cutter blades, Fig. 11 is a fragmentary sectional view of the lower cutter blades, Fig. 12 is an end view of a piece of work that has been operated upon by the machine.

In the accompanying drawings, 1 designates either the top plate of a molding machine or a plate adapted to be suitably clamped upon the top of the molding machine. The plate intermediate its ends and at its rear edge is cut away as at 2, to accommodate the cutting blades of the molding machine. These blades are illustrated in Figs. 1, 7 to 11 inclusive and consist of lower cutter blades 3 and upper cutter blades 4, the lower set of cutter blades 3 comprising threaded sleeve 5 having tangentially disposed arms 6 provided with detachable cutting blades 7. The sleeve 5 is adapted to fit upon the driven vertically disposed spindle of a molding machine. The upper set of cutter blades 4 comprises an interiorly and exteriorly threaded split sleeve 8 having arms and blades similar to the lower set of cutting blades. After the upper set of cutting blades is mounted upon the threaded sleeve 5, a desired distance above the lower set of cutting blades, a lock nut 9 is placed upon the split threaded sleeve 8 to clamp the same in engagement with the threaded sleeve 5.

The plate 1 is provided with longitudinally disposed guide boards 10, the inner ends of said boards terminating at side boards 11 arranged at the edges of the cut away portion 2 of the plate 1. The upper edges of the side boards 11 are provided with revoluble eyelets or winged thumb screws 12, the object of which will presently appear.

The inner ends of the guide boards 10 are recessed, as at 14, and extending into said recesses are the ends of a guard rail 15, said rail being raised and lowered through the medium of screw bolts 16 passing downwardly through the guide boards 10 and engaging the ends of the guard rail 15. The guard rail 15 is adapted to lie between the upper and lower sets of cutting blades 3 and 4, said rail limiting the inward movement of a piece of work and preventing the same from contacting with the revoluble threaded sleeve 5 of the lower set of cutting blades 3.

Hinged to the rear edge of the plate 1, as at 17, are two curved straps 18, the free ends of said straps being provided with a clamp board 19 which is cut away as at 20, to conform to the curvature of the cut away portion 2 of the plate 1.

The guide boards 10 are recessed, as at 21, and provided with upwardly extending screw bolts 22, said bolts passing through openings formed in the straps 18 and being provided with coiled springs 23 adapted to normally hold the straps 18 within the recesses 21 of the guide boards 10.

Adapted to fit over the sets of cutting blades 3 and 4 is a shield 24, said shield being provided with a central opening 25 to receive the upper end of the threaded sleeve 5 and with slots or elongated openings 26 to receive the screw eyelets 12 of the side boards, said eyelets being partially rotated to lock the shield in position over the cutting blades.

The piece of work to be operated upon is placed beneath the clamping board 19, said board being elevated by placing the springs 23 under tension, said springs normally maintaining the clamp board 19 upon the top of the piece of work and preventing it from being dislodged while operated upon by the cutting blades of the molding machine. The guide boards 10 serve to guide and steady a piece of work while a workman or operator is moving the piece of work in front of the cutting blades of the machine. It will thus be observed that when the edge of a piece of work, such as a board, is presented to the cutting blades, that the top and bottom edges of the board or piece of work will be cut away, as at 27 in Fig. 12 of the drawings.

It is apparent from the illustration of my invention that a workman can easily and quickly manipulate a piece of work upon the molding machine, and that by using my improvement, the efficiency of the machine is considerably increased and a more even and uniform piece of work produced. After the cutting blades and the guard rail have been properly set, there is very little danger of a piece of work being ruined by the negligence of the workman or operator.

It is obvious that such variations in the size, proportion and minor details of my invention as are permissible by the appended claims, may be resorted to without departing from the spirit and scope of the invention.

What I claim and desire to secure by Letters Patent, is:—

1. In a molding machine, the combination with two sets of adjustable and revoluble cutting blades, of a plate cut away to clear said blades, guide boards carried by said plate, side boards carried by said plate, a guard rail adjustably mounted between the confronting ends of said guide boards and arranged between said sets of cutting blades, a clamp board hinged to the rear edge of said plate and resiliently connected to the upper edges of said guide boards, and a shield detachably secured to the upper edges of said side boards.

2. In a molding machine, the combination with two sets of adjustable and revoluble cutting blades, of a plate cut away to clear said blades, longitudinally disposed guide boards carried by said plate, a guard rail extending between the sets of said blades and having its ends adjustably held in the ends of said guide boards, a clamp board hinged to the rear edge of said plate, and resiliently connected to said guide boards, and a shield detachably mounted over said blades.

In testimony whereof I affix my signature in the presence of two witnesses.

FRANK SANDERS.

Witnesses:
  MAX H. SROLOVITZ,
  K. H. BUTLER.